(12) United States Patent
Nakamura et al.

(10) Patent No.: US 7,950,487 B2
(45) Date of Patent: May 31, 2011

(54) EXHAUST SYSTEM FOR MOTORCYCLE AND MOTORCYCLE INCLUDING THE SAME

(75) Inventors: Kenta Nakamura, Wako (JP); Kazuro Furukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 12/275,717

(22) Filed: Nov. 21, 2008

(65) Prior Publication Data

US 2009/0152038 A1 Jun. 18, 2009

(30) Foreign Application Priority Data

Dec. 17, 2007 (JP) ................................ 2007-325280

(51) Int. Cl.
*B62D 61/02* (2006.01)
(52) U.S. Cl. ....................................... 180/227; 180/226
(58) Field of Classification Search .................. 180/226, 180/227
See application file for complete search history.

(56) References Cited

U.S. PATENT DOCUMENTS

| | | | | |
|---|---|---|---|---|
| 4,706,774 | A * | 11/1987 | Tsuboi ........................... | 180/227 |
| 4,809,802 | A * | 3/1989 | Seino et al. .................... | 180/231 |
| 5,069,303 | A * | 12/1991 | Fuller ........................... | 180/219 |
| 5,480,001 | A * | 1/1996 | Hara ............................ | 180/227 |
| 6,527,289 | B2 * | 3/2003 | Parigian ....................... | 280/284 |
| 7,137,468 | B2 * | 11/2006 | Siddle .......................... | 180/227 |
| 7,267,193 | B2 * | 9/2007 | Nagashii et al. .............. | 180/219 |
| 7,650,955 | B2 * | 1/2010 | Hasegawa et al. ............. | 180/227 |
| 2002/0043415 | A1 * | 4/2002 | Okuma et al. ................ | 180/225 |
| 2002/0089145 | A1 * | 7/2002 | Toyoda et al. ............. | 280/281.1 |
| 2006/0076176 | A1 * | 4/2006 | Oshima et al. ................ | 180/219 |
| 2006/0151226 | A1 * | 7/2006 | Misaki et al. ................. | 180/227 |
| 2007/0119155 | A1 * | 5/2007 | Tongu et al. ................... | 60/299 |
| 2007/0277517 | A1 * | 12/2007 | Yamakura et al. ............. | 60/323 |
| 2009/0242305 | A1 * | 10/2009 | Asano ........................... | 180/219 |

FOREIGN PATENT DOCUMENTS

| | | |
|---|---|---|
| CN | 1496882 A | 5/2004 |
| JP | 3773597 B2 | 2/2006 |

OTHER PUBLICATIONS

Chinese Office Action for corresponding CN Application No. 200810172202.9, Sep. 7, 2010.

* cited by examiner

*Primary Examiner* — Joanne Silbermann
*Assistant Examiner* — Tashiana Adams
(74) *Attorney, Agent, or Firm* — Ditthavong Mori & Steiner, P.C.

(57) ABSTRACT

An exhaust system for a motorcycle includes a bracket which includes a joint portion, an engine support portion, and a swing-arm support portion. The joint portion is configured to be connected to a vehicle-body frame. The engine support portion is configured to support an engine. The swing-arm support portion is provided separately from the joint portion and configured to support a swing arm which is swingable with respect to the vehicle-body frame and at a rear end of which a rear wheel is provided. An exhaust pipe extends rearwards from the engine. A muffler is connected to a rear end of the exhaust pipe and disposed along the swing arm. A muffler is connected to a rear end of the muffler support stay and a front end of which is connected to the bracket separately from the joint portion.

10 Claims, 6 Drawing Sheets

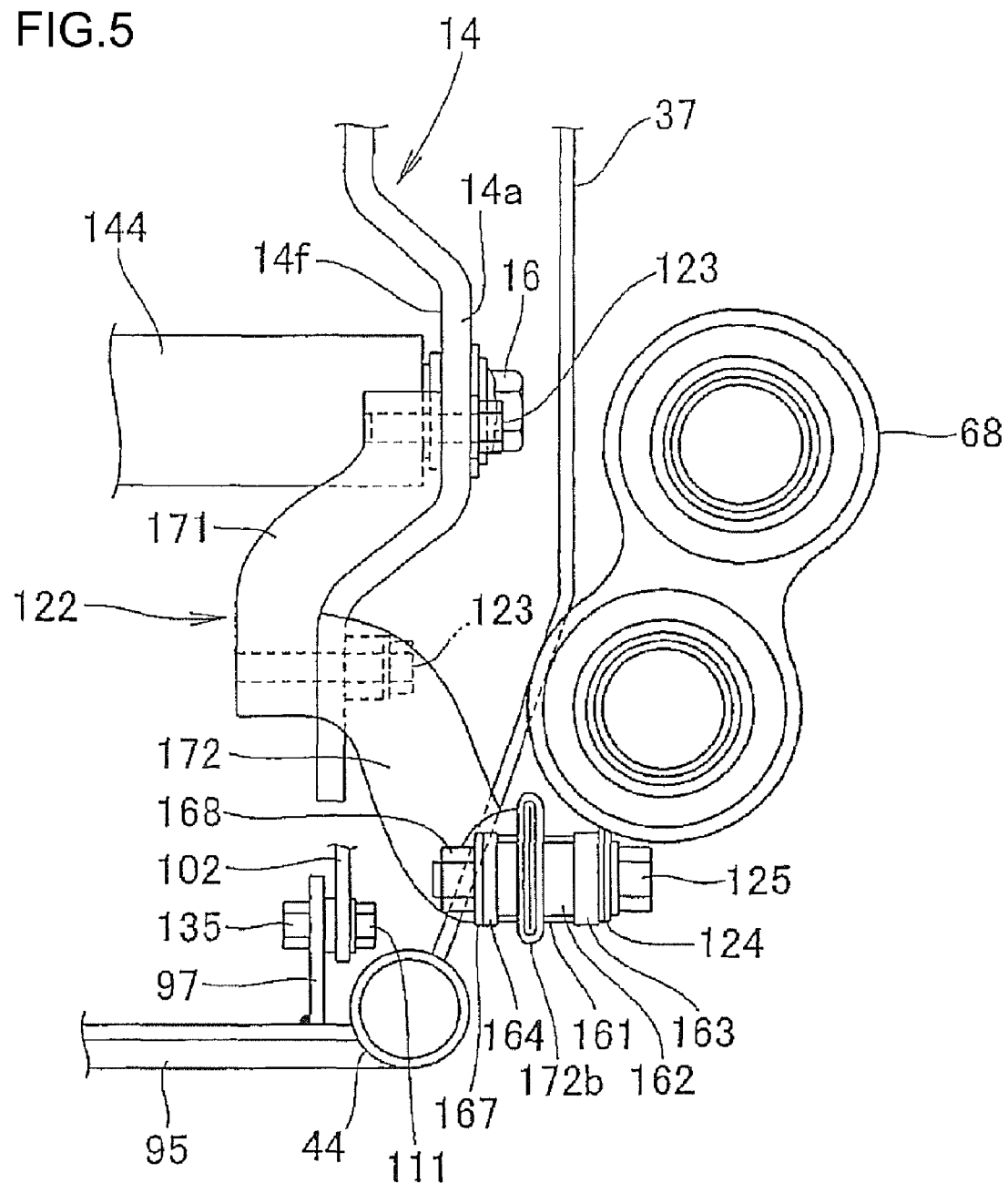

EXHAUST SYSTEM FOR MOTORCYCLE AND MOTORCYCLE INCLUDING THE SAME

CROSS-REFERENCE TO RELATED APPLICATIONS

The present application claims priority under 35 U.S.C. §119 to Japanese Patent Application No. 2007-325280, filed Dec. 17, 2007. The contents of this application are incorporated herein by reference in their entirety.

BACKGROUND OF THE INVENTION

1. Field of the Invention

The present invention relates to an exhaust system for a motorcycle and a motorcycle including the exhaust system.

2. Discussion of the Background

As a conventional-type exhaust system of a motorcycle, an exhaust system including a muffler supported to a vehicle body with a muffler-supporting bracket (see Japanese Patent No. 3773597, for example) is known.

The contents of Japanese Patent No. 3773597 are incorporated herein by reference in their entirety.

FIGS. 2 to 4 of Japanese Patent No. 3773597 show the following configuration. A front-side exhaust pipe 3 extends rearwards from a front-side cylinder 2 of a front-and-rear V-type engine 1. A rear-side exhaust pipe 5 extends rearwards from a rear-side cylinder 4 of the engine 1. A single muffler 6 is coupled to the rear ends of the front-side exhaust pipe 3 and the rear-side exhaust pipe 5. The muffler 6 is connected to a vehicle body with a muffler support stay 11.

In addition, the engine 1 is attached to the vehicle body with engine mounts 16a and 16b. Meanwhile, a rear swing arm 18 is attached to the vehicle body, and a rear wheel 9 is attached to the rear end of the rear swing arm 18.

When the rear swing arm 18 is directly attached to the vehicle body as described in Patent Document 1, a large external force or vibrations might be transmitted from the ground surface to the vehicle body through the rear wheel 9 and the rear swing arm 18, for example.

In addition, when the engine 1 is directly attached to the vehicle body, large vibrations might be transmitted from the engine 1 to the vehicle body. Moreover, even when the engine 1 is not directly attached to the vehicle body, vibrations might be transmitted from the engine 1 to the vehicle body. Specifically, when the muffler 6 is attached to the vehicle body with the muffler support stay 11, vibrations from the engine 1 will be transmitted to the vehicle body sequentially through the front-side exhaust pipe 3, the rear-side exhaust pipe 5, the muffler 6 and the muffler support stay 11.

SUMMARY OF THE INVENTION

According to one aspect of the present invention, an exhaust system for a motorcycle includes a bracket, an exhaust pipe, a muffler, and a muffler support stay. The bracket includes a joint portion, an engine support portion, and a swing-arm support portion. The joint portion is configured to be connected to a vehicle-body frame. The engine support portion is configured to support an engine. The swing-arm support portion is provided separately from the joint portion and configured to support a swing arm which is swingable with respect to the vehicle-body frame and at a rear end of which a rear wheel is provided. The exhaust pipe extends rearwards from the engine. The muffler is connected to a rear end of the exhaust pipe and disposed along the swing arm. The muffler is connected to a rear end of the muffler support stay and a front end of which is connected to the bracket separately from the joint portion.

According to another aspect of the present invention, a motorcycle includes a vehicle-body frame, a swing arm, a rear wheel, a bracket, an exhaust pipe, a muffler, and a muffler support stay. The swing arm is swingable with respect to the vehicle-body frame. The rear wheel is provided at a rear end of the swing arm. The bracket includes a joint portion, an engine support portion, and a swing-arm support portion. The joint portion is connected to the vehicle-body frame. The engine support portion supports an engine. The swing-arm support portion supports the swing arm and is provided separately from the joint portion. The exhaust pipe extends rearwards from the engine. The muffler is connected to a rear end of the exhaust pipe and disposed along the swing arm. The rear end of the muffler support stay is connected to the muffler. The front end of the muffler support stay is connected to the bracket separately from the joint portion.

Some of the advantageous effects obtainable with an embodiment of the present invention are as follows. Since the swing-arm support portion is formed separately away from the vehicle-body-frame joint portion, the bracket between the swing-arm support portion and the vehicle-body-frame joint portion is allowed to twist and bow elastically. The bracket thus absorbs the external force and the vibrations that are transmitted from the ground surface via the rear wheel and the swing arm. As a consequence, the bracket allows less large external force and vibrations to be transmitted to the vehicle-body frame.

In addition, since the engine support portion is formed in the bracket, the part of the bracket located between the engine support portion and the vehicle-body-frame joint portion is allowed to twist and bow elastically. The bracket thus absorbs the vibrations produced by the engine, so that the bracket can prevent large vibrations from being transmitted to the vehicle-body frame.

Moreover, the rear end of the muffler support stay that supports the muffler is attached to the muffler while the front end thereof is attached to the bracket at a position away from the vehicle-body-frame joint portion. Accordingly, the part of the bracket located between the muffler support stay and the vehicle-body-frame support portion is allowed to twist and bow elastically. The bracket thus also absorbs the vibrations that have been transmitted from the engine to the muffler. As a consequence, the bracket can prevent large vibrations from being transmitted to the vehicle-body frame.

Some of the advantageous effects obtainable with another embodiment of the present invention are as follows. The muffler support stay is disposed with its longitudinal side extending along the swing arm, and the muffler is disposed also along the swing arm. Accordingly, the muffler, the muffler support stay, and the swing arm extend in the same direction and are disposed within a compact space as if these members were a single integrated body.

In addition, since the muffler support stay is disposed along the swing arm when viewed from a side, the muffler support stay becomes less noticeable.

Some of the advantageous effects obtainable with the other embodiment of the present invention are as follows. The weight of the drive shaft disposed at the one side to the swing arm becomes more balanced with the weight in total of the muffler and the muffler support stay disposed at the opposite side to the swing arm.

In the first embodiment of the present invention, the bracket includes the swing-arm support portion which supports the swing arm, and which is formed separately away from the vehicle-body-frame joint portion. In addition, the exhaust pipe extends rearwards from the engine, and the muffler connected to the rear end of the exhaust pipe is disposed along the swing arm. Moreover, the muffler support stay, which supports the muffler, has its rear end attached to the muffler, and has its front end attached to the bracket at a position away from the vehicle-body-frame joint portion. Accordingly, the bracket helps the engine, the swing arm, and the muffler to move as if these members formed a single unit. The bracket is allowed to twist and bow elastically with respect to the vehicle-body frame. This can reduce the transmission of a large external force and the vibrations from the ground surface to the vehicle-body frame, and can also reduce the transmission of the vibrations produced by the engine to the vehicle-body frame.

In the second embodiment of the present invention, the muffler support stay is disposed with its longitudinal side extending along the swing arm in the front-to-rear direction of the vehicle body. Accordingly, the muffler and the muffler support stay are disposed along the swing arm. As a consequence, the muffler, the muffler support stay, and the swing arm can be disposed within a compact space at a side of the vehicle body. In addition, since the muffler support stay is disposed along the swing arm when viewed from a side, the muffler support stay becomes less noticeable, and the external appearance can be improved.

In the third embodiment of the present invention, the drive shaft that drives the rear wheel is disposed at the one side of the swing arm while the muffler and the muffler support stay are disposed at the opposite side to the swing arm. Accordingly, the balance in the lateral direction of the vehicle body can be improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a view on the arrow 5 of FIG. 3; and

DESCRIPTION OF THE EMBODIMENTS

Figure 1:
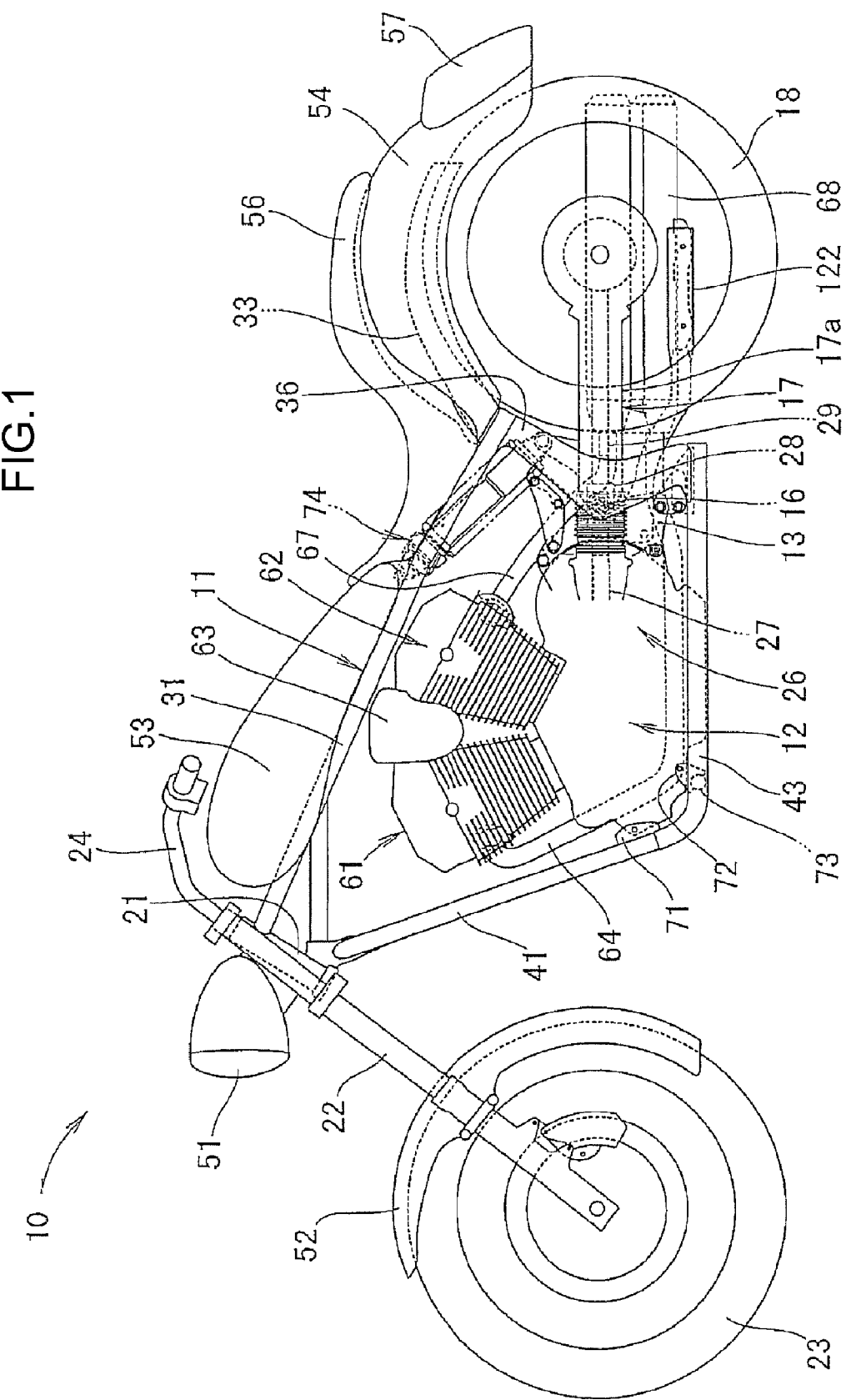
FIG. 1 is a side view of a motorcycle with an exhaust system according to an embodiment of the present invention.

The embodiments will now be described with reference to the accompanying drawings, wherein like reference numerals designate corresponding or identical elements throughout the various drawings.

FIG. 1 is a side view of a motorcycle equipped with an exhaust system according to an embodiment of the present invention. A motorcycle 10 is an American-type vehicle and includes: a vehicle-body frame 11; a V-type engine 12, which is disposed at the inner side of the vehicle-body frame 11; a left and right pair of dented brackets 13 and 14, which are disposed at the rear of the engine 12 and which are attached to the rear side of the engine 12 and to the vehicle-body frame 11 (note that only the dented bracket 13 located on the near side is shown in FIG. 1); a swing arm 17, which is attached to a pivot shaft 16 attached, in turn, to the dented brackets 13 and 14 so that the swing arm 17 can move swinging freely up and down; a rear wheel 18, which is attached to the rear end of the swing arm 17; a front fork 22, which is attached to a head pipe 21 forming the front end of the vehicle-body frame 11 so that the front fork 22 can be steered freely; a front wheel 23, which is attached to the bottom-end portion of the front fork 22; and a handlebar 24, which is attached to the top-end portion of the front fork 22.

The vehicle-body frame 11 includes: the above-mentioned head pipe 21; a left and right pair of main frames 31 and 32, which extend from the head pipe 21 obliquely downwards to the rear (note that only the main frame 31 located on the near side is shown in FIG. 1); a left and right pair of rear upper frames 33 and 34, which are attached respectively to rear portions of the main frames 31 and 32 (note that only the rear upper frame 33 located on the near side is shown in FIG. 1); a left and right pair of center frames 36 and 37 (note that only the center frame 36 located on the near side is shown in FIG. 1); a left and right pair of down frames 41 and 42, which extend nearly downwards from the head pipe 21 (note that only the down frame 41 located on the near side is shown in FIG. 1); a left and right pair of lower frames 43 and 44, which are connected respectively to the bottom ends of the down frames 41 and 42, and which are attached respectively to the bottom ends of the center frames 36 and 37 (note that only the lower frame 43 located on the near side is shown in FIG. 1); and plural cross members (not illustrated), which connect the above-mentioned right and left members of the vehicle-body frame 11.

The engine 12 is provided with a transmission 26 at the rear portion thereof, and the engine 12 and the transmission together form a single unit. In the transmission 26, an output shaft 27 is connected to a drive shaft 29 with a universal joint 28. The drive shaft 29 transmits the power from the transmission 26 to the rear wheel 18. A shaft casing 17a is formed on the left-hand side of the swing arm 17, and the drive shaft 29 is installed in the shaft casing 17a.

The engine 12 includes: a front-side cylinder portion 61, which forms the front side of the V-type engine 12; and a rear-side cylinder portion 62, which forms the rear side of the V-type engine 12. A carburetor 63 is connected to both the front-side cylinder portion 61 and the rear-side cylinder portion 62. From the front-side cylinder portion 61, a first exhaust pipe 64 extends, firstly, obliquely downwards to the rear, and then is turned and extends rearwards. From the rear-side cylinder portion 62, a second exhaust pipe 67 extends obliquely downwards to the rear. A muffler 68 is coupled to the rear ends of the first exhaust pipe 64 and the second exhaust pipe 67.

Other members shown in FIG. 1 are: a head lamp 51, which is attached to the head pipe 21; a front fender 52, which covers the front wheel 23 from above; a fuel tank 53, which is attached to the main frames 31 and 32; a rear fender 54, which is attached to the rear upper frames 33 and 34 so as to cover the rear wheel 18 from above; a seat 56, which is attached to the main frames 31 and 32 and to the rear fencer 54; a tail lamp 57, which is attached to a rear portion of the rear fender 54; engine support brackets 71 and 72, which are provided to support the front-side bottom portion of the engine 12, the engine support brackets 71 being provided respectively to the down frames 41 and 42, and the engine support brackets 72 being provided respectively to the lower frames 43 and 44 (to be more specific, the engine support brackets 72 being provided to a cross pipe 73 that is provided to connect the left and the right lower frames 43 and 44 to each other); a rear cushion unit 74, which is attached to both the swing arm 17 and the vehicle-body frame 11 so as to connect the swing arm 17 and the vehicle-body frame 11 to each other.

Figure 2:
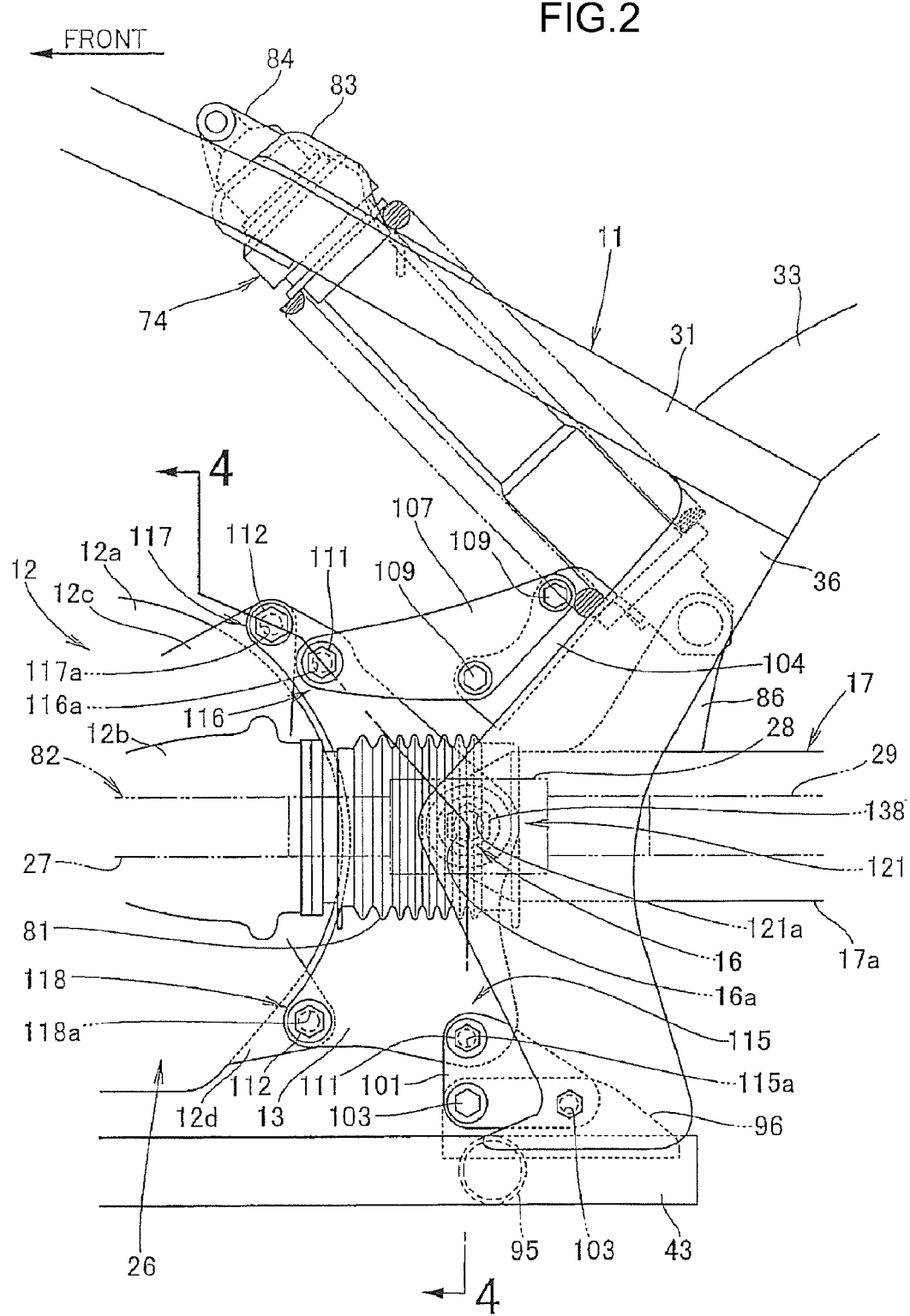
FIG. 2 is a side view of a principal portion of the motorcycle according to the embodiment of the present invention, which is a view illustrating a pivot shaft and the vicinity thereof.

FIG. 2 is a side view illustrating a principal portion of the motorcycle including a pivot shaft and the vicinity thereof according to this embodiment of the present invention (The arrow FRONT in the drawing indicates the front side of the motorcycle; from now on, likewise). The output shaft 27 of the transmission 26 is installed in an output-shaft casing 12b that is formed in a crankcase 12a of the engine 12. A bellows-like rubber boot 81 is provided to connect the output-shaft casing 12b and the shaft casing 17a to each other.

The output shaft 27, the universal joint 28, and the drive shaft 29 are the component parts that form a power transmission shaft 82 to transmit the power from the transmission 26 to the rear wheel 18 (see FIG. 1).

The rubber boot 81 absorbs the angle change that occurs between the side of the transmission 26 and the side of the swing arm 17 when swinging motion of the swing arm 17 bends the universal joint 28. In addition, the rubber boot 81 prevents rainwater and dusts from intruding into the output-shaft casing 12b and the shaft casing 17a.

Other members shown in FIG. 2 are: a cross member 83, which is attached so as to connect the left and the right main frames 31 and 32 to each other (note that only the main frame 31 located on the near side is shown in FIG. 2) and which has a square-C sectional shape; a support bracket 84, which is attached to the cross member 83; and an upper bracket 86, which is disposed on an upper portion of the swing arm 17. One end of the rear cushion unit 74 is attached to the support bracket 84 while the other end thereof is attached to the upper bracket 86.

In addition, FIG. 2 shows the following configuration. A cross member 95 is attached so as to connect the left and the right lower frames 43 and 44 of the vehicle-body frame 11 to each other (note that only the lower frame 43 located on the near side is shown in FIG. 2). A left and right pair of up-rise plates 96 and 97 (note that only the up-rise plate 96 located on the near side is shown in FIG. 2) is attached to an upper portion of the cross member 95. Triangular plates 101 and 102 (note that only the triangular plate 101 located on the near side is shown in FIG. 2) are attached to their respective up-rise plates 96 and 97 with their respective bolts 103 and 103. Upper brackets 104 and 106 (note that only the upper bracket 104 located on the near side is shown in FIG. 2) are attached to their respective center frames 36 and 37 (note that only the center frame 36 located on the near side is shown in FIG. 2). Upper plates 107 and 108 (note that only the upper plate 107 located on the near side is shown in FIG. 2) are attached to their respective upper brackets 104 and 106 with their respective bolts 109 and 109. The dented bracket 13 is attached to both the triangular plate 101 and the upper plate 107 respectively with bolts 111 and 111. The dented bracket 14 (not illustrated in FIG. 2) is attached to both the triangular plate 102 and the upper plate 108 respectively with bolts 111 and 111. The engine 12 is attached to the dented brackets 13 and 14 with plural bolts 112. FIG. 2 also shows supported portions 12c and 12d, which are formed on both the left and right sides of the crankcase 12a of the engine 12 and which are supported by the dented brackets 13 and 14, respectively.

The pivot shaft 16 has a first end 16a attached to the dented bracket 13. The center frame 36 covers the first end 16a from the outer side so that the first end 16a may not stick out from the side of the vehicle body and may not be exposed outside.

Each of the dented brackets 13 and 14 is a member in which a lower connection hole 115a, an upper connection hole 116a, an upper support hole 117a, a lower support hole 118a, and a center support hole 121a are formed. Each of the dented brackets 13 and 14 includes a vehicle-body-frame joint portion 115, another vehicle-body-frame joint portion 116, an engine support portion 117, another engine support portion 118, and a swing-arm support portion 112. The vehicle-body-frame joint portion 115 is formed around the lower connection hole 115a, and connects each of the dented brackets 13 and 14 of the vehicle-body frame 11 to the corresponding one of the lower frames 43 and 44 with the cross member 95, with the corresponding one of the up-rise plates 96 and 97, and with the corresponding one of the triangular plates 101 and 102. The vehicle-body-frame joint portion 116 is formed around the upper connection hole 116a, and connects each of the dented brackets 13 and 14 to the corresponding one of the center frames 36 and 37 of the vehicle-body frame 11 with the corresponding one of the upper brackets 104 and 106 and with the corresponding one of the upper plates 107 and 108. The engine support portion 117 is formed around the upper support hole 117a, and the supported portion 12c is attached to the engine support portion 117 so as to support the engine 12. The engine support portion 118 is formed around the lower support hole 118a, and the supported portion 12d is attached to the engine support portion 118 so as to support the engine 12. The swing-arm support portion 121 is formed around the center support hole 121a so as to support the swing arm 17.

Incidentally, each of the dented brackets 13 and 14 has a substantially polygonal shape. The vehicle-body-frame joint portions 115 and 116, the engine support portions 117 and 118, and the swing-arm support portion 121 are formed respectively near the vertices of each of the dented brackets 13 and 14.

Figure 3:
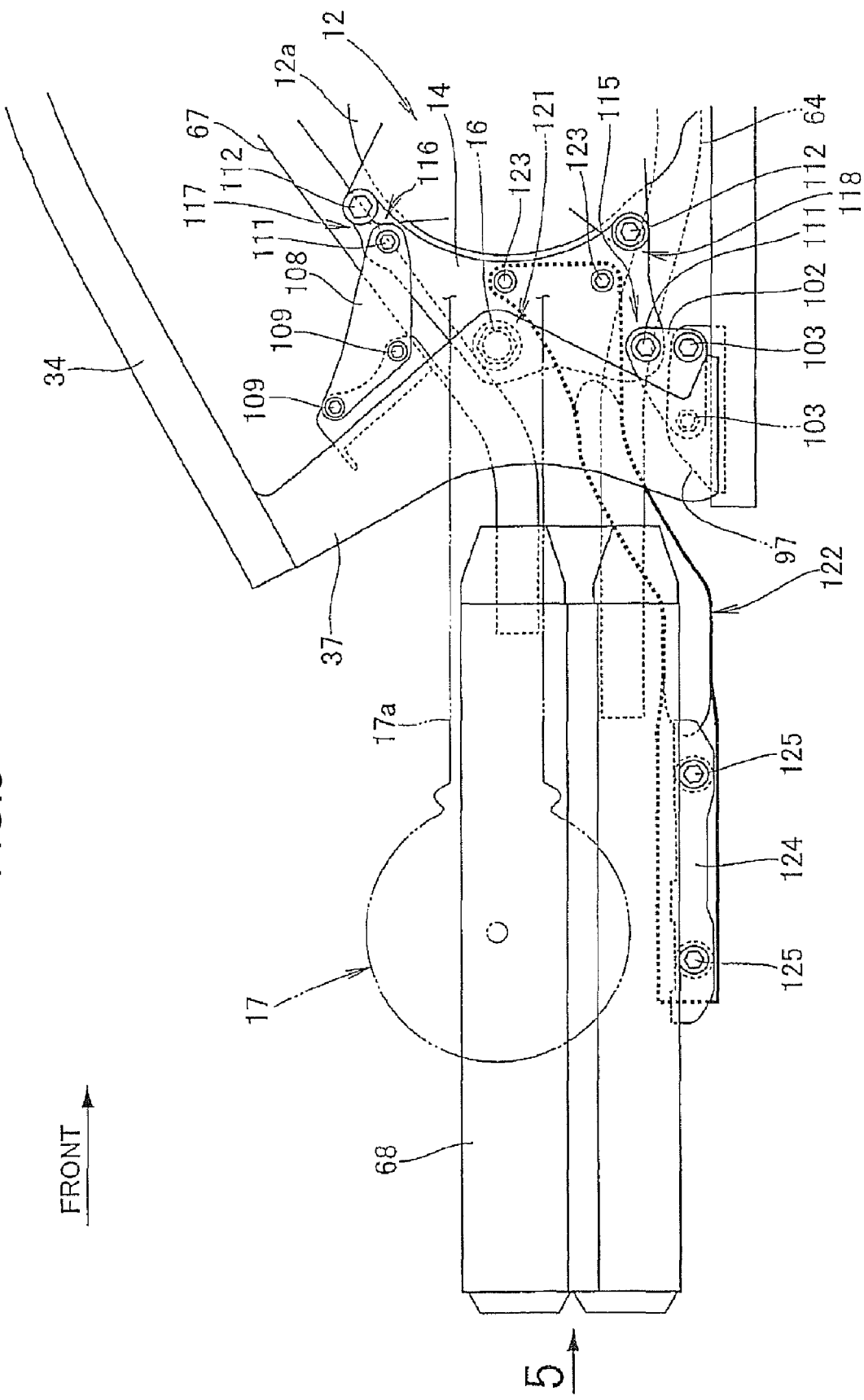
FIG. 3 is a side view of a principal portion of the motorcycle according to the embodiment of the present invention when seen from the right-hand side of the motorcycle.

FIG. 3 is a side view illustrating a principal portion on the right-hand side of the motorcycle according to the embodiment of the present invention. A muffler support stay 122 (its contour is drawn by a thick line) is provided to support the muffler 68. The front end of the muffler support stay 122 is attached to the dented bracket 14 with bolts 123 and 123. A muffler attachment bracket 124 that is formed in a bottom portion of the muffler 68 is attached to a rear end portion of the muffler support stay 122 with bolts 125 and 125.

The muffler support stay 122 has its longitudinal side extend in the front-to-rear direction along the swing arm 17.

Figure 4:
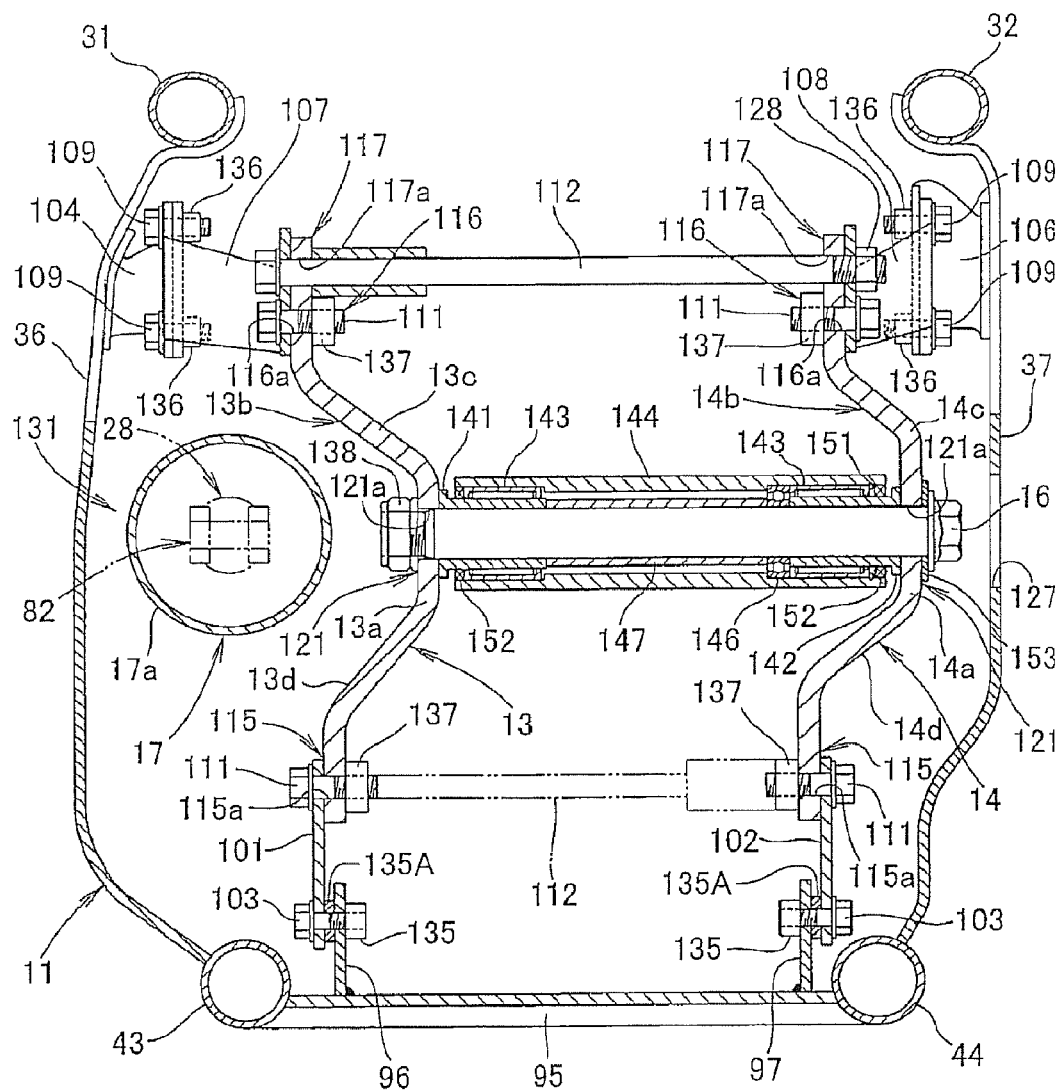
FIG. 4 is a sectional view taken along the line 4-4 of FIG. 2.

FIG. 4 is a sectional view taken along the line 4-4 of FIG. 2 (The arrow LEFT in the drawing indicates the left-hand side of the vehicle body; and the arrow RIGHT indicates the right-hand side of the vehicle body). The dented brackets 13 and 14 are plate-lake members, and have their respective middle portions—to be more specific, pivot-shaft attachment portions 13a and 14a respectively where the pivot shaft 16 is to be attached—bent in the same direction. The dented brackets 13 and 14 thus formed are disposed between the center frames 36 and 37.

The pivot shaft 16 and the bolts 112 and 112 provided to support the engine 12 (see FIG. 2) are members that are disposed so as to connect the left and the right dented brackets 13 and 14. A pivot-shaft insertion hole 127 is formed in the center frame 37 so as to allow the pivot shaft 16 to pass therethrough. In addition, nuts 128 are screwed respectively onto the leading ends of the bolts 112.

The dented brackets 13 and 14 are members that are bent so as to make their respective pivot-shaft attachment portions 13a and 14a protrude to the right-hand side. As a result, recessed portions 13b and 14b are formed respectively at the left-hand sides of the pivot-shaft attachment portions 13a and 14a. FIG. 4 shows a space 131 that is formed by the recessed portion 13b of the dented bracket 13 of the left-hand side between the same dented bracket 13 and the center frame 36 of the left-hand side. The shaft casing 17a of the swing arm 17 and the universal joint 28 for the drive shaft 29 (see FIG. 2) are disposed in the space 131.

Other members and portions shown in FIG. 4 are: slope portions 13c and 13d, which form the recessed portion 13b of the dented bracket 13; slope portions 14c and 14d, which form the recessed portion 14b of the dented bracket 14; nuts 135 and 135, which are welded respectively to the up-rise plates 96 and 97 so as to be screwed respectively onto the bolts 103 and 103; spacers 135A and 135A; nuts 136 . . . which are welded to the upper brackets 104 and 106 so as to be screwed onto the bolts 109 . . . ; nuts 137 and 137, which are welded respectively to the dented brackets 13 and 14 so as to be screwed onto the bolts 111 and 111; a nut 138, which is screwed onto an end portion of the pivot shaft 16.

In addition, a left-side collar 141 and a right-side collar 142 are fitted onto the pivot shaft 16. A sleeve 144 is rotatably fitted onto the left-side and the right-side collars 141 and 142 with needle bearings 143 and 143 set in between.

The sleeve 144 is a member which forms a part of the swing arm 17 (see FIG. 3) and which is provided in the front end of the swing arm 17.

A ball bearing 146 is disposed so as to be adjacent to and in contact with the one of the needle bearings 143 and 143. The ball bearing 146 is fitted onto the pivot shaft 16 and is fitted into the sleeve 144. In addition, a center collar 147 is disposed between the ball bearing 146 and the left-side collar 141, and is fitted onto the pivot shaft 16. A stopper ring 151 is fitted to the inner surface of the sleeve 144 so as to restrict the position, in the axial direction, of the sleeve 144. The stopper ring 151 is disposed so as to be adjacent to and in contact with the above-mentioned one of the needle bearings 143 and 143. Dust seals 152 and 152 are provided to prevent the dusts from intruding into the sleeve 144. Furthermore, a washer 153 is also provided.

FIG. 5 is a view seen as indicated by the arrow 5 of FIG. 3. The front-end portion of the muffler support stay 122 is attached to an inner-side surface 14f of the right-side dented bracket 14 with the two bolts 123 and 123. In addition, the muffler attachment bracket 124 is attached to the rear-end portion of the muffler support stay 122 with the bolts 125 and 125 (note that only the bolt 125 located on the near side is shown in FIG. 5) so that the bottom portion of the muffler 68—having a shape that resembles a figure of eight when viewed from the back side—can be fastened eventually to the muffler support stay 122.

The rear-end portion of the muffler support stay 122 is a portion where two cylindrical collars 161 and 162 are attached side by side in the horizontal direction. Rubber damping members 163 and 164 are inserted respectively from the two ends of each of the collar 161 and 162. Each of the bolts 125 and 125 is inserted into the set of the damping members 163 and 164 from the side of the damping member 163. Washers 167 are fitted respectively onto the bolts 125 and 125, and then nuts 168 and 168 are screwed respectively onto the leading ends of the bolts 125 and 125. In this way, the muffler attachment bracket 124 is fastened to the rear-end portion of the muffler support stay 122.

Figure 6A:
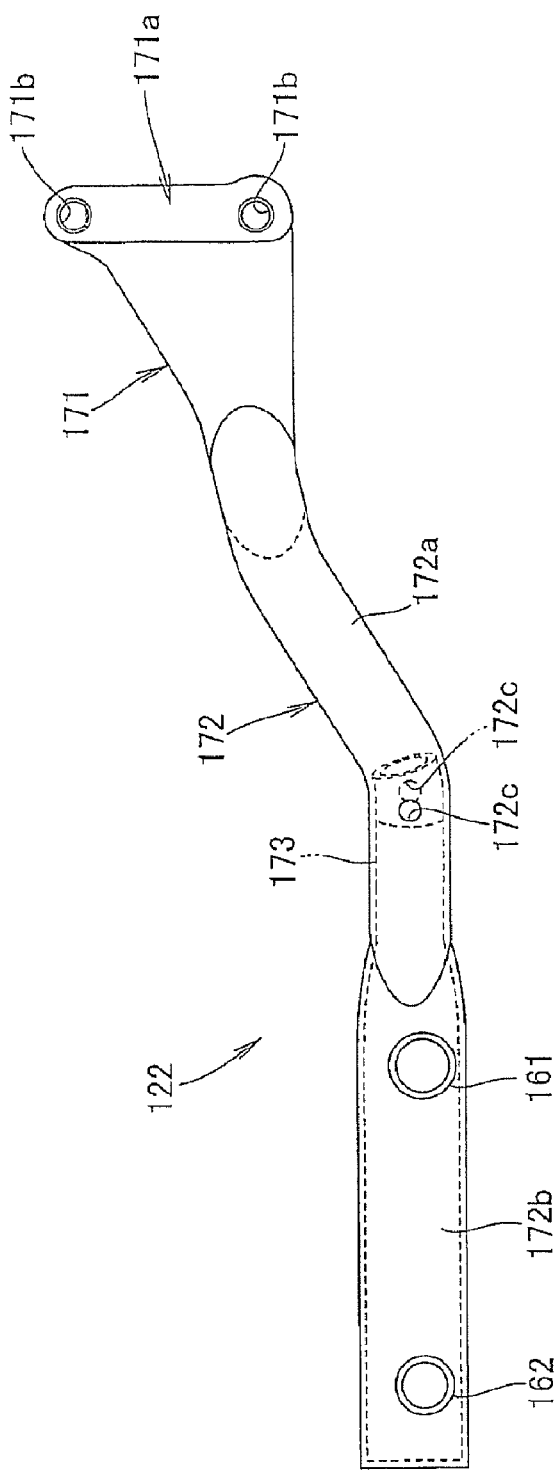
FIGS. 6A and 6B are explanatory views illustrating a muffler support stay according to the embodiment of the present invention.
Figure 6B:
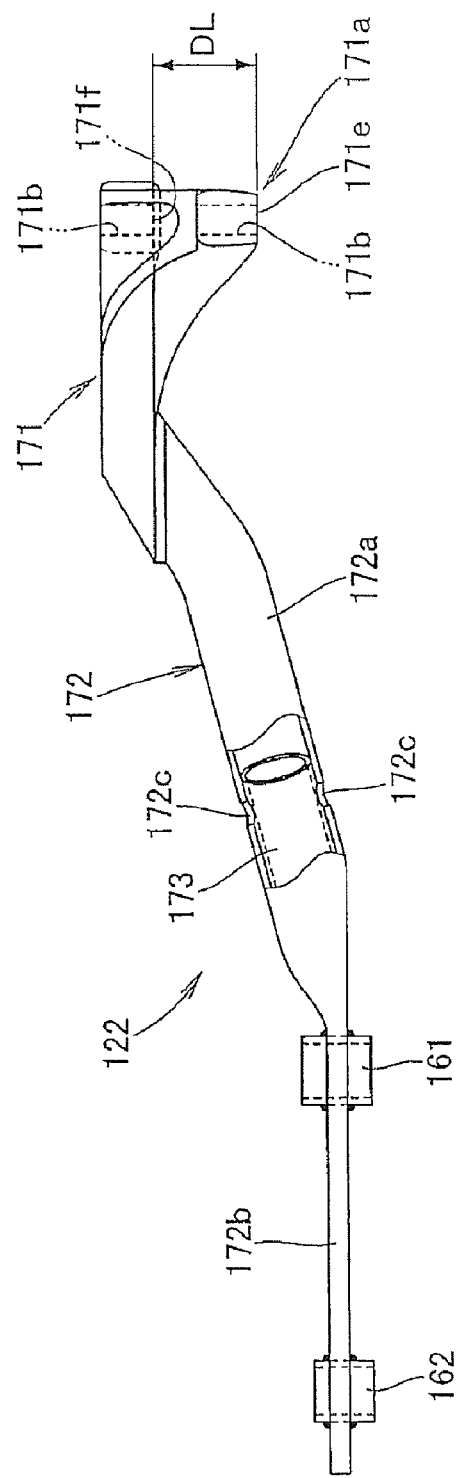

FIGS. 6A and 6B are explanatory diagrams illustrating the muffler support stay according to the embodiment of the present invention. FIG. 6A is a side view of the muffler support stay 122. The muffler support stay 122 includes a front-side attachment portion 171, an outer pipe 172, an inner pipe 173, and the collars 161 and 162. The front-side attachment portion 171 is formed by casting and has an attachment face 171a that is attached to the dented bracket 14 (see FIG. 3). The outer pipe 172 is made of a steel pipe, and is welded to the front-side attachment portion 171. The inner pipe 173 is made of a steel pipe, and is inserted into the outer pipe 172. The collars 161 and 162 are attached so as to penetrate both the outer pipe 172 and the inner pipe 173.

The front-side attachment portion 171 is a portion in which female threads 171b and 171b are formed. The muffler support stay 122 is attached to the dented bracket 14 by screwing the bolts 123 and 123 (see FIG. 3) respectively into the female threads 171b and 171b.

The outer pipe 172 includes a middle portion 172a and a rear portion 172b. The middle portion 172a extends from the side of the front-side attachment portion 171 so as to form an S-shape. The rear portion 172b extends straight from the leading end of the middle portion 172a.

Two through holes 172c and 172c are formed in the middle portion 172a, and are used when the inner pipe 173 is welded to the outer pipe 172.

The rear portion 172b is a portion where the collars 161 and 162 are attached.

FIG. 6B is a top plan view of the muffler support stay 122. The attachment face 171a formed in the front-side attachment portion 171 of the muffler support stay 122 includes: an upper attachment face 171e, which is formed around the upper one of the female threads 171b and 171b; and a lower attachment face 171f, which is formed around the lower one of the female threads 171b and 171b. A difference in level DL in the vehicle-width direction (in the up and down direction in FIG. 6B) is formed between the upper attachment face 171e and the lower attachment face 171f.

The difference in level DL is formed so as to fit the shape of the dented bracket 14 (see FIG. 4) that the front-side attachment portion 171 is attached to. Forming the difference in level DL allows the dented bracket 14 to support the muffler support bracket 122 with different heights. Accordingly, the muffler support bracket 122 can be supported by the dented bracket 14 more strongly than in the case of an attachment structure with no difference in level. In addition, the difference in level DL prevents the muffler support bracket 122 from being inclined in a way that may cause the rear end of the muffler support bracket 122 to oscillate in the vehicle-width direction.

The rear portion 172b is a portion that is formed to be flat by being pressed in the vehicle-width direction after the insertion of the inner pipe 173 into the outer pipe 172. The rear portion 172b is a portion formed into a shape to which the collars 161 and 162 can be attached easily.

Inserting the inner pipe 173 into the outer pipe 172 helps the rear half of the middle portion 172a and the rear portion 172b to have both a higher strength and a higher stiffness. As a consequence, the rear portion 172b can support sufficiently the load acting on the muffler 68.

As FIGS. 1 to 4 show, this embodiment of the present invention has the following configuration. In the motorcycle 10, the rear wheel 18 is attached to the rear end of the swing arm 17 that is swingable with respect to the vehicle-body frame 11. The motorcycle 10 is provided with the dented brackets 13 and 14 and includes: the vehicle-body-frame joint portions 115 and 116, which are attached to the vehicle-body frame 11; and the engine support portions 117 and 118, which support the engine 12. The dented brackets 13 and 14 include their respective swing-arm support portions 121 that support the swing arm 17. The swing-arm support portions 121 are formed so as to be separated away from both of the vehicle-body-frame joint portions 115 and 116. The exhaust pipes— specifically, the first exhaust pipe 64 and the second exhaust pipe 67—extend rearwards from the engine 12. The rear ends of the first and second exhaust pipes 64 and 67 are connected to the muffler 68 that is disposed along the swing-arm 17. The muffler support stay 122 that supports the muffler 68 has its rear end attached to the muffler 68 and has its front end attached to the dented bracket 14 in a position separated away from the vehicle-body-frame joint portions 115 and 116. Accordingly, the engine 12, the swing arm 17, and the muffler 68 can move like a single united body with help of the dented bracket 14. The dented bracket 14 twists and bows elastically with respect to the vehicle-body frame 11. As a consequence, it becomes possible to make less the large external force and the vibrations transmitted from the ground surface to the vehicle-body frame 11 and the vibrations that are produced in the engine 12.

In addition, in the embodiment of the present invention, the muffler support stay 122 is disposed so as to have its longitudinal side oriented along the swing arm 17 in the front-to-rear direction of the vehicle body. Accordingly, the muffler 68 and the muffler support stay 122 are disposed along the swing arm 17. As a consequence, the muffler 68, the muffler support stay 122, and the swing arm 17 are disposed at a lateral side of the vehicle body within a small space. In addition, arranging the muffler support stay 122 along the swing arm 17 when seen from the lateral side can make the muffler support stay 122 less noticeable. Accordingly, the external appearances can be improved.

Moreover, in the embodiment of the present invention, the drive shaft 29 to drive the rear wheel 18 is disposed at one side to the swing arm 17 while the muffler 68 and the muffler support stay 122 are disposed at the opposite side to the swing arm 17. To put it differently, the drive shaft 29 is disposed at one side to the rear wheel 18 while the muffler 68 and the muffler support stay 122 are disposed at the opposite side to the rear wheel 18. Accordingly, the lateral balance of the vehicle body can be improved.

The exhaust system according to the embodiment of the present invention is suitable for a motorcycle.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An exhaust system for a motorcycle, comprising:
    a bracket including a joint portion, an engine support portion, and a swing-arm support portion, the joint portion being configured to be connected to a vehicle-body frame, the engine support portion being configured to support an engine, the swing-arm support portion being provided separately from the joint portion and configured to support a swing arm which is swingable with respect to the vehicle-body frame and at a rear end of which a rear wheel is provided;
    an exhaust pipe extending rearwards from the engine;
    a muffler connected to a rear end of the exhaust pipe and disposed along the swing arm; and
    a muffler support stay having a front end and a rear end, the muffler being connected to the rear end, the front end being connected to the bracket separately from the joint portion, wherein a drive shaft configured to drive the rear wheel is disposed at one side of the swing arm, and wherein the muffler and the muffler support stay are disposed at an opposite side of the swing arm.

2. The exhaust system for a motorcycle according to claim 1, wherein the muffler support stay extends in the longitudinal direction from the front end connected to the bracket to the rear end being adjacent to the rear end of the swing arm at which the rear wheel is provided.

3. The exhaust system for a motorcycle according to claim 1, wherein the front end of the muffler support stay is attached to the bracket by two bolts to form a cantilever.

4. The exhaust system for a motorcycle according to claim 1, wherein the rear end of the muffler support stay is attached to a lower surface of the muffler.

5. The exhaust system for a motorcycle according to claim 1, wherein the muffler support stay has a longitudinal direction and is disposed so that the longitudinal direction extends along the swing arm in a front-to-rear direction of the vehicle body.

6. A motorcycle comprising:
    a vehicle-body frame;
    a swing arm swingable with respect to the vehicle-body frame;
    a rear wheel provided at a rear end of the swing arm;
    a bracket including a joint portion, an engine support portion, and a swing-arm support portion, the joint portion being connected to the vehicle-body frame, the engine support portion supporting an engine, the swing-arm support portion supporting the swing arm and being provided separately from the joint portion;
    an exhaust pipe extending rearwards from the engine;
    a muffler connected to a rear end of the exhaust pipe and disposed along the swing arm; and
    a muffler support stay having a front end and a rear end, the muffler being connected to the rear end, the front end being connected to the bracket separately from the joint portion, wherein a drive shaft configured to drive the rear wheel is disposed at one side of the swing arm, and wherein the muffler and the muffler support stay are disposed at an opposite side of the swing arm.

7. The motorcycle according to claim 6, wherein the muffler support stay extends in the longitudinal direction from the front end connected to the bracket to the rear end being adjacent to the rear end of the swing arm at which the rear wheel is provided.

8. The motorcycle according to claim 6, wherein the front end of the muffler support stay is attached to the bracket by two bolts to form a cantilever.

9. The motorcycle according to claim 6, wherein the rear end of the muffler support stay is attached to a lower surface of the muffler.

10. The exhaust system for a motorcycle according to claim 6, wherein the muffler support stay has a longitudinal direction and is disposed so that the longitudinal direction extends along the swing arm in a front-to-rear direction of the vehicle body.

* * * * *